(12) United States Patent
Bourret et al.

(10) Patent No.: US 10,794,727 B2
(45) Date of Patent: Oct. 6, 2020

(54) METHOD AND DEVICE FOR VERIFYING A GUIDANCE SIGNAL

(71) Applicant: Airbus Operations SAS, Toulouse (FR)

(72) Inventors: Thierry Bourret, Toulouse (FR); Nicolas Marconnet, Castelnau d'Estretefonds (FR)

(73) Assignee: AIRBUS OPERATIONS SAS, Toulouse (FR)

(*) Notice: Subject to any disclaimer, the term of this patent is extended or adjusted under 35 U.S.C. 154(b) by 699 days.

(21) Appl. No.: 15/614,683

(22) Filed: Jun. 6, 2017

(65) Prior Publication Data
US 2017/0356757 A1 Dec. 14, 2017

(30) Foreign Application Priority Data
Jun. 9, 2016 (FR) ...................... 16 55278

(51) Int. Cl.
*G01C 25/00* (2006.01)
*G08G 5/02* (2006.01)
*G01C 23/00* (2006.01)
*G01C 21/20* (2006.01)
*G01S 1/18* (2006.01)
*G05D 1/06* (2006.01)
*G01C 21/00* (2006.01)
(Continued)

(52) U.S. Cl.
CPC ............... *G01C 25/00* (2013.01); *G01C 5/06* (2013.01); *G01C 21/005* (2013.01); *G01C 21/04* (2013.01); *G01C 21/20* (2013.01); *G01C 23/005* (2013.01); *G01S 1/16* (2013.01); *G01S 1/18* (2013.01); *G01S 19/48* (2013.01);

*G05D 1/0676* (2013.01); *G08G 5/0021* (2013.01); *G08G 5/0086* (2013.01); *G08G 5/025* (2013.01)

(58) Field of Classification Search
USPC ........................................ 702/94
See application file for complete search history.

(56) References Cited

U.S. PATENT DOCUMENTS 3,776,455 A * 12/1973 Gee .................. G01C 23/005
701/17
5,781,151 A 7/1998 Stratton
(Continued)

FOREIGN PATENT DOCUMENTS

GB 2165415 4/1986

OTHER PUBLICATIONS

French Search Report, dated Jan. 26, 2017, priority document.
"Flight Inspection—The 'State of the Art'", Digital avionics systems conference, Oct. 30, 1994.

*Primary Examiner* — Paul D Lee
(74) *Attorney, Agent, or Firm* — Greer, Burns & Crain, Ltd.

(57) ABSTRACT

A verification method comprising a first step of measuring at least one position parameter of an aircraft and a first set of steps implemented after the flight of at least one aircraft, in an automatic and repetitive manner, comprising computing a geographical height of an aircraft with respect to the runway on the basis of the position parameters of an aircraft, computing an evaluated vertical deviation, between the geographical height and a reference height, and computing a vertical error on the basis of a comparison between the evaluated vertical deviation and the reference vertical deviation.

15 Claims, 6 Drawing Sheets

(51) Int. Cl.
    *G01C 5/06*     (2006.01)
    *G01S 1/16*     (2006.01)
    *G01C 21/04*     (2006.01)
    *G08G 5/00*     (2006.01)
    *G01S 19/48*     (2010.01)

(56) References Cited

U.S. PATENT DOCUMENTS

| | | | |
|---|---|---|---|
| 8,027,756 B2* | 9/2011 | Davis | G01C 21/00 |
| | | | 701/14 |
| 8,494,693 B2* | 7/2013 | Murphy | G08G 5/025 |
| | | | 340/947 |
| 9,613,537 B2* | 4/2017 | Meserole, Jr. | G08G 5/0043 |
| 9,776,734 B2* | 10/2017 | Eberle | B64D 45/08 |
| 2013/0046462 A1* | 2/2013 | Feyereisen | G08G 5/0021 |
| | | | 701/457 |
| 2014/0100720 A1* | 4/2014 | Fleiger-Holmes | G01S 1/18 |
| | | | 701/4 |

\* cited by examiner

METHOD AND DEVICE FOR VERIFYING A GUIDANCE SIGNAL

CROSS-REFERENCES TO RELATED APPLICATIONS

This application claims the benefit of the French patent application No. 1655278 filed on Jun. 9, 2016, the entire disclosures of which are incorporated herein by way of reference.

TECHNICAL FIELD

The present invention relates to a method and a device for verifying a vertical guidance signal and a lateral guidance signal.

BACKGROUND OF THE INVENTION

During an airport landing runway (otherwise called "runway") approach procedure, an aircraft can be guided in its landing on the runway by a radio navigation system. This radio navigation system can correspond to an instrument landing system (ILS). The ILS system comprises at least one emitting station able to emit guidance signals allowing the aircraft to approach a reference approach trajectory. Included among these signals is, in particular, a vertical guidance signal, otherwise called the descent alignment signal, allowing the aircraft to ascertain the vertical deviation that it possesses with the reference approach trajectory. This vertical guidance signal is generally named the "Glide signal" or "Glide slope signal." There is also a lateral guidance signal, otherwise called the runway alignment signal, allowing the aircraft to ascertain the lateral deviation that it possesses with the reference approach trajectory. This lateral guidance signal is generally called the "Localizer signal."

The stations emitting these signals are regularly checked by local authorities. The objective of these checks is to guarantee that the precision of the signals transmitted by the ground emitting stations of the ILS system complies with the norms of the International Civil Aviation Organization (ICAO). Indeed, the entire demonstration of safety of the operations using these signals rests upon certain assumptions about the precision of the ground installations which have to be verified periodically. The period between the verificatory checks is generally six months.

To date, the checks are carried out through specific flights, with the aid of an aircraft specially equipped to carry out this check, but also with the aid of a van which follows the runway to carry out this check. These flights require significant investment which is broken down in the following manner:

possession and servicing of the specific aircraft and of the specific van,
  involvement of a crew to carry out these check flights,
  fuel consumption for carrying out these flights as well as for transporting the aircraft,
  loss of takeoff and landing slots through the closure of the runway for the duration of the check flights.

The current verification method for checking guidance signals is therefore not satisfactory, since it requires the deployment of a specifically equipped aircraft in order to check the quality and the precision of the Glide slope signal and of the Localizer signal. This constraint induces an occupancy of the runway in a regular manner, this having the impact of neutralizing the runway in question until the checks are finished.

SUMMARY OF THE INVENTION

An object of the present invention is to alleviate this drawback by proposing a method making it possible to verify a guidance signal transmitted to an aircraft without requiring significant investment.

For this purpose, the invention relates to a method for verifying at least one guidance signal representative of a reference guidance signal including a vertical guidance signal representative of a reference vertical deviation, the signals being able to be transmitted to each aircraft by a ground emitter device to assist the aircraft with landing on a runway.

According to the invention, the verification method comprises:

a first measurement step, implemented by at least one first measurement module onboard at least one aircraft, in an automatic and repetitive manner, during at least one flight of the aircraft along an approach trajectory of the aircraft, during an approach to the runway, the first measurement step comprising measuring and recording in a memory at least one position parameter of an aircraft and a parameter corresponding to the vertical guidance signal;

a first set of steps, implemented after the flight of at least one aircraft in an automatic and repetitive manner, the first set of steps comprising, for each of a plurality of different distances with respect to a threshold of the runway along the approach trajectory of the aircraft:

a height computation step, implemented by a first computation module, comprising computing an aircraft geographical height with respect to the runway on the basis of the aircraft position parameters, a vertical deviation computation step, implemented by a second computation module, comprising computing a vertical deviation, termed the evaluated vertical deviation, between the geographical height and a reference height, a vertical error computation step, implemented by a third computation module, comprising computing a vertical error on the basis of a comparison between the evaluated vertical deviation and the reference vertical deviation determined as a function of the parameter corresponding to the vertical guidance signal.

Thus, by virtue of the invention, it is no longer necessary to perform specific flights to evaluate an error in the guidance signal. The use of data generally recorded in the memories of aircraft, in particular of commercial airplanes, carrying out a landing, suffices to evaluate this error.

According to a particular feature, the evaluated vertical deviation is computed with the aid of the following equation: $\Delta Z_{dev} = H_{geo} - X \tan \theta$, in which:

X is the distance with respect to the threshold of the runway along an approach trajectory of the aircraft, θ is the slope between the reference approach trajectory and a plane comprising the runway.

According to a first variant, the first measurement step comprises:

measuring a height relative to the ground with the aid of a radio altimeter embedded onboard forming part of the first measurement module, measuring an attitude of the aircraft with the aid of a geolocation module embedded onboard forming part of the first measurement module, storing the height, the altitude and the reference vertical deviation in a memory;

the height computation step comprises:

a sub-step of computing geographical height comprising, for each of a plurality of different distances with respect to the threshold of the runway along the approach trajectory of the aircraft, computing, as geographical height of the aircraft, the sum, on the one hand, of the reference vertical deviation and, on the other hand, of the product of the distance with respect to the threshold (4a) of the runway and of the tangent of a slope of the reference approach trajectory;

a sub-step of reference terrain profile computation, implemented by a second computation sub-module, consisting in computing, on the basis of the geographical height, a reference terrain profile along an approach axis of an aircraft, the terrain profile representing an evolution of a height of the terrain before the threshold of the runway as a function of the distance with respect to the threshold of the runway, a sub-step of computing an offset of the reference terrain profile, implemented by a third computation sub-module, consisting in computing an offset between the reference terrain profile and a terrain profile determined on the basis of heights measured by the radio altimeter, a sub-step of computing a straightened terrain profile, implemented by a fourth computation sub-module, consisting in setting the reference terrain profile on the terrain profile determined on the basis of heights measured by the radio altimeter by subtracting the computed offset from each distance with respect to the threshold of the runway.

According to one embodiment of the first variant, the geographical height is computed with the aid of the following equation: $H_{geo}(X)=H_{RA}(X-\Delta X)+\text{Prof}(X)$ in which:

X is the distance with respect to the threshold of the runway, $\Delta X$ is the offset between the reference terrain profile and the terrain profile determined on the basis of heights measured by the radio altimeter, $H_{RA}(X)$ is the height measured by the radio altimeter at a distance with respect to the threshold of the runway, $\text{Prof}(X)$ is the terrain profile determined on the basis of heights measured by the radio altimeter as a function of the distance with respect to the threshold of the runway.

According to a second variant, the first measurement step comprises furthermore:

measuring an attitude of the aircraft with the aid of a geolocation module embedded onboard forming part of the first measurement module (5), storing the altitude and the reference vertical deviation in a memory;

the height computation step comprises:

a sub-step of computing geographical height comprising, for each of a plurality of different distances with respect to the threshold of the runway along the approach axis of the aircraft:

computing an error constant due to the geolocation module in the altitude measurement, the error constant being computed when the aircraft touches the ground and/or measured by the radio altimeter when the aircraft passes above the threshold of the runway, computing a geographical height measured by the geolocation module corresponding to the difference between the altitude measured by the geolocation module and an altitude of the threshold of the runway (4), stored in a memory, computing the geographical height corresponding to the difference between the geographical height measured by the geolocation module and the error constant engendered by the geolocation module.

According to one embodiment of the second variant, the geographical height is computed with the aid of the following equation: $H_{geo}(X)=H_{GPS}(X)+\Delta H$ in which:

X is the distance with respect to the threshold of the runway, $H_{Gps}(X)$ is the height measured by the geolocation module, $\Delta H$ is the error constant engendered by the geolocation module.

According to a third variant, the first measurement step comprises furthermore:

measuring a barometric height of the aircraft with the aid of a barometric altimeter embedded onboard forming part of the first measurement module, measuring a total air temperature and a Mach number of the aircraft with the aid of sensors embedded onboard forming part of the first measurement module, storing the barometric height, the temperature, the Mach number and the reference vertical deviation in a memory;

the height computation step comprises:

a sub-step of computing geographical height comprising, for each of a plurality of different distances with respect to the threshold of the runway along the approach trajectory of the aircraft:

estimating, with the aid of the total air temperature, of the Mach number and of the barometric height, a variation of the static temperature dependent on the altitude and a ground temperature, computing a height measured with the aid of the barometric height and of the variation of the static temperature and of the ground temperature.

For example, the measured height is computed with the aid of the following equation:

$$H_{geo} = \frac{T_{est}/(L_{est} \times K)}{1-[(T_0 - L_0 \times H_{baro} \times K)/T_0]^{L_{est}/L_0}}$$

in which:

$H_{baro}$ is the barometric height, $L_{est}$ is the estimation of the variation of the static temperature dependent on the altitude, $L_0$ is a variation of the static temperature, as a function of altitude, of a standard atmosphere model, $T_{est}$ is the estimated temperature on the ground, $T_0$ is a reference temperature of the standard atmosphere model, K is a dimensionless constant.

Moreover, the first measurement step comprises furthermore:

measuring the position of the aircraft so as to store the position of the aircraft in the memory; and/or determining the distance to the runway threshold so as to store the distance to the runway threshold in the memory.

Moreover, the method furthermore comprises:

a second measurement step implemented by a second measurement module, on at least one aircraft, in an automatic and repetitive manner, during an approach to the runway, the second measurement step comprising measuring and in recording in the memory at least one geographical position of the aircraft, termed the measured geographical position, and a parameter corresponding to a lateral guidance signal;

a second set of steps implemented after the flight of the aircraft in an automatic and repetitive manner, the second set of steps comprising:

a lateral deviation computation step, implemented by a fourth computation module, comprising computing a lateral deviation, termed the evaluated lateral deviation, between the measured geographical position and a projected position corresponding to the projection of the measured geographical position onto the reference approach trajectory, a lateral error computation step, implemented by a fifth computation module, comprising computing a lateral error on the basis of a comparison between the evaluated lateral deviation and a reference lateral deviation determined as a function of the parameter corresponding to the lateral guidance signal.

The invention also relates to a device for verifying a vertical guidance signal representative of a reference vertical deviation and a lateral guidance signal representative of a reference lateral deviation, the signals being able to be transmitted to an aircraft by a ground emitter device to assist the aircraft with landing on a runway.

According to the invention, the device comprises:

a first measurement module configured to measure at least one position parameter of an aircraft, in an automatic and repetitive manner, during at least one flight of the aircraft and a parameter corresponding to the vertical guidance signal, during an approach to the runway, the first measurement module being embedded onboard at least one aircraft, a memory configured to record at least one position parameter of an aircraft and a parameter corresponding to the vertical guidance signal, a first computation module configured to compute an aircraft geographical height with respect to the runway on the basis of the aircraft position parameters, in an automatic and repetitive manner after the flight of at least one aircraft, for each of a plurality of different distances with respect to a threshold of the runway along an approach trajectory of the aircraft, a second computation module configured to compute an evaluated vertical deviation, between the geographical height and a reference height, in an automatic and repetitive manner after the flight of at least one aircraft, for each of a plurality of different distances with respect to a threshold of the runway along the approach trajectory of the aircraft, a third computation module configured to compute a vertical error on the basis of a comparison between the evaluated vertical deviation and the reference vertical deviation determined as a function of the parameter corresponding to the vertical guidance signal, in an automatic and repetitive manner after the flight of at least one aircraft, for each of a plurality of different distances with respect to a threshold of the runway along the approach trajectory of the aircraft.

According to a particular feature, the first measurement module comprises at least:

a radio altimeter embedded onboard configured to measure a height of the aircraft relative to the ground, a memory configured to store the heights measured by the radio altimeter.

According to another particular feature, the first computation module furthermore comprises a first computation sub-module configured to compute, for each of a plurality of different distances with respect to the threshold of the runway along the approach axis of the aircraft, a geographical height on the basis of the position parameters of the aircraft.

According to the first variant, the first computation module also comprises:

a second computation sub-module configured to compute, on the basis of the geographical height, a reference terrain profile along an approach axis of an aircraft, the terrain profile representing an evolution of a height of the terrain before the threshold of the runway as a function of the distance with respect to the threshold of the runway, a third computation sub-module configured to compute an offset between the reference terrain profile and a terrain profile determined on the basis of heights measured by the radio altimeter, a fourth computation sub-module configured to set the reference terrain profile on the terrain profile determined on the basis of heights measured by the radio altimeter by subtracting the computed offset from each distance with respect to the threshold of the runway.

Moreover, the device comprises:

a second measurement module configured to, in an automatic and repetitive manner, during an approach to the runway, measure at least one geographical position of the aircraft, termed the measured geographical position, a fourth computation module, configured to compute a lateral deviation, termed the evaluated lateral deviation, between the measured geographical position and a projected position corresponding to the projection of the measured geographical position onto the reference approach trajectory, a fifth computation module, comprising computing a lateral error on the basis of a comparison between the evaluated lateral deviation and the reference lateral deviation determined as a function of the parameter corresponding to the lateral guidance signal.

BRIEF DESCRIPTION OF THE DRAWINGS

The invention, with its characteristics and advantages, will emerge more clearly on reading the description given with reference to the appended drawings in which.

DETAILED DESCRIPTION OF THE PREFERRED EMBODIMENTS

The subsequent description will make reference to the figures cited hereinabove.

Figure 3:
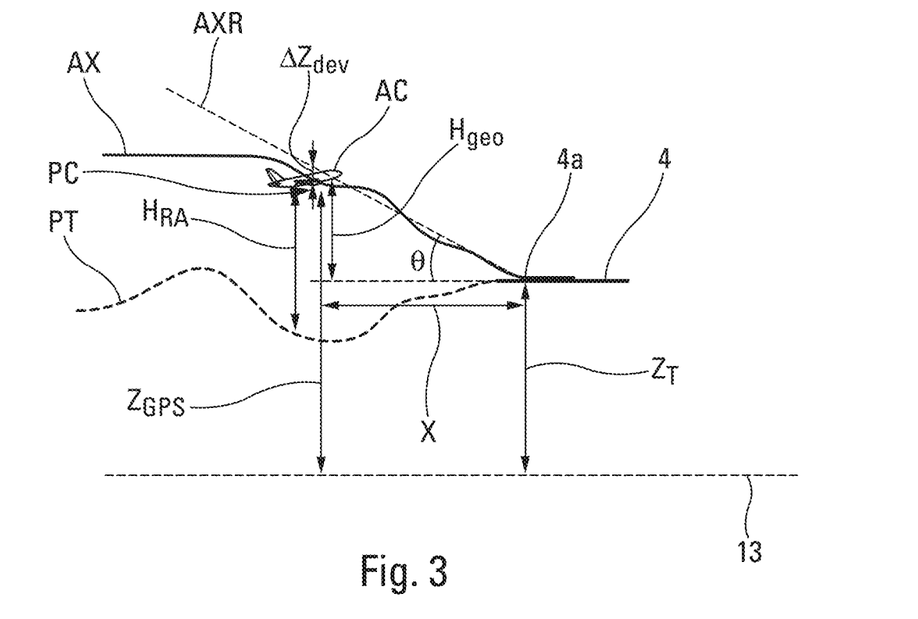
FIG. 3 corresponds to a schematic representation of an aircraft during an approach to a landing runway depicting a vertical deviation.

In the subsequent description, we consider that an altitude corresponds to a height relative to sea level 13 (FIG. 3).

Figure 8:
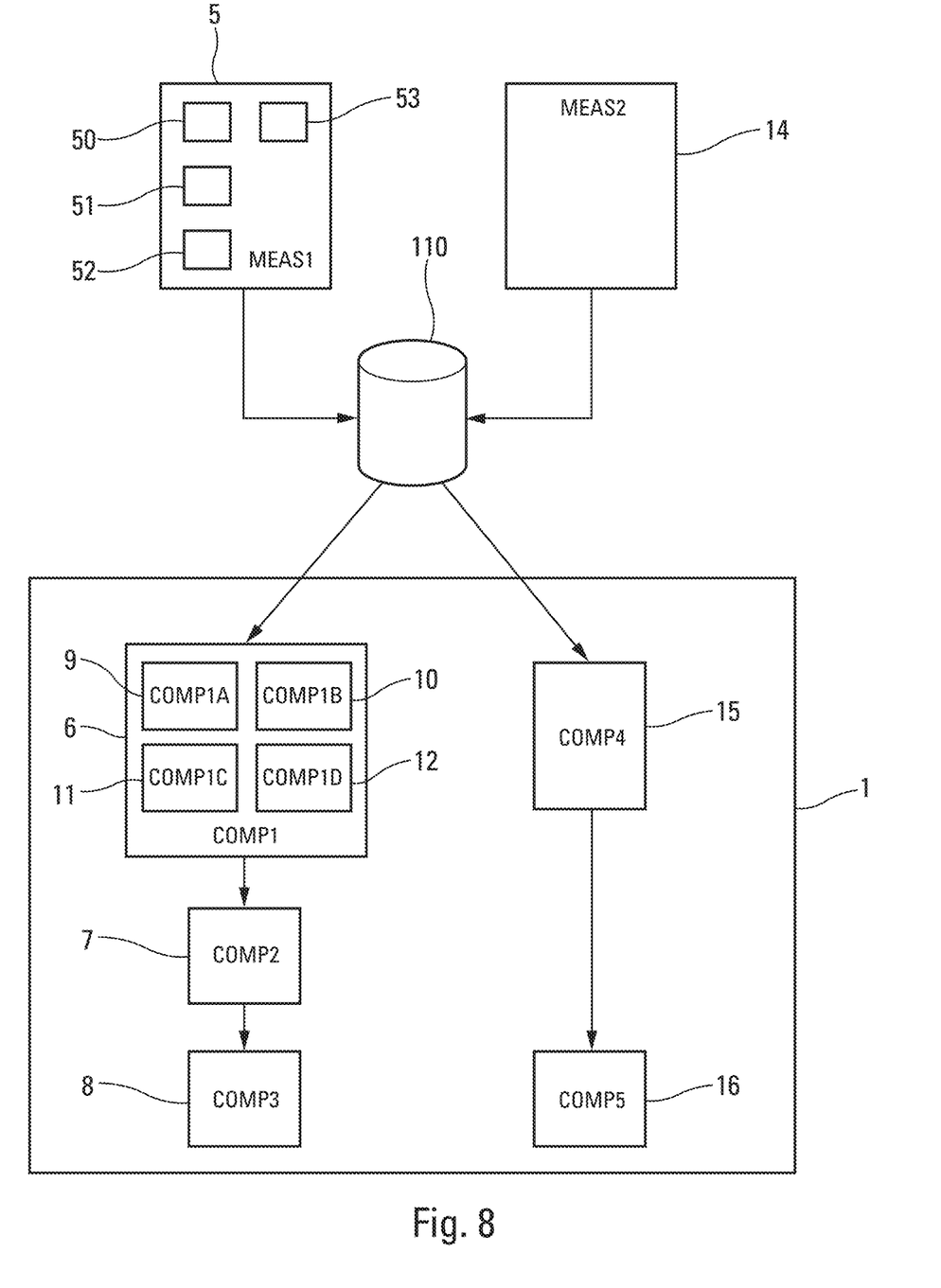
FIG. 8 represents a schematic diagram of the verification device according to one embodiment.

FIG. 8 illustrates an embodiment of a device for verifying a reference vertical guidance signal 2 and a reference lateral guidance signal 3.

Figure 1:
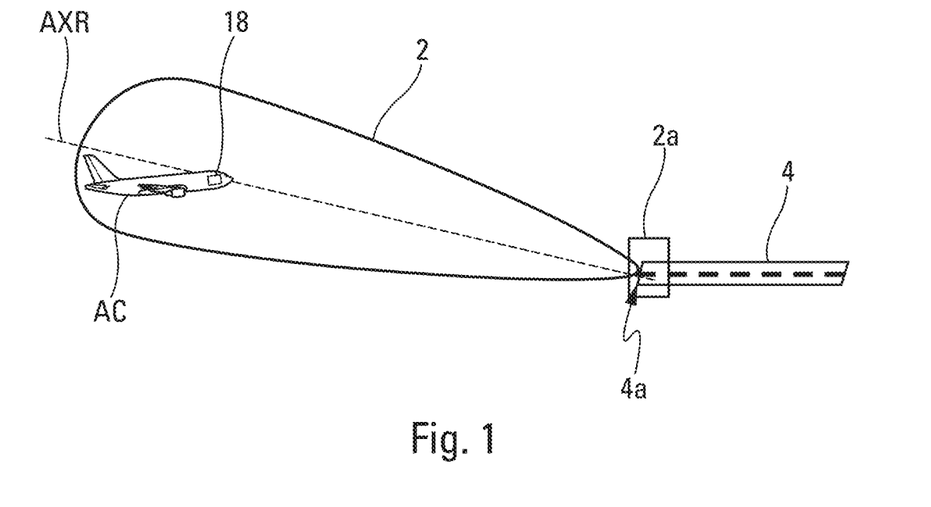
FIG. 1 corresponds to a schematic representation of a vertical guidance signal transmitted to an aircraft.

As represented in FIG. 1, the reference vertical guidance signal 2 corresponds to a signal of "Glide Slope signal" type able to be transmitted to the aircraft AC, in particular a transport airplane, by a ground emitting station 2a of a device for assisting the landing of the aircraft AC on a runway 4.

Figure 2:
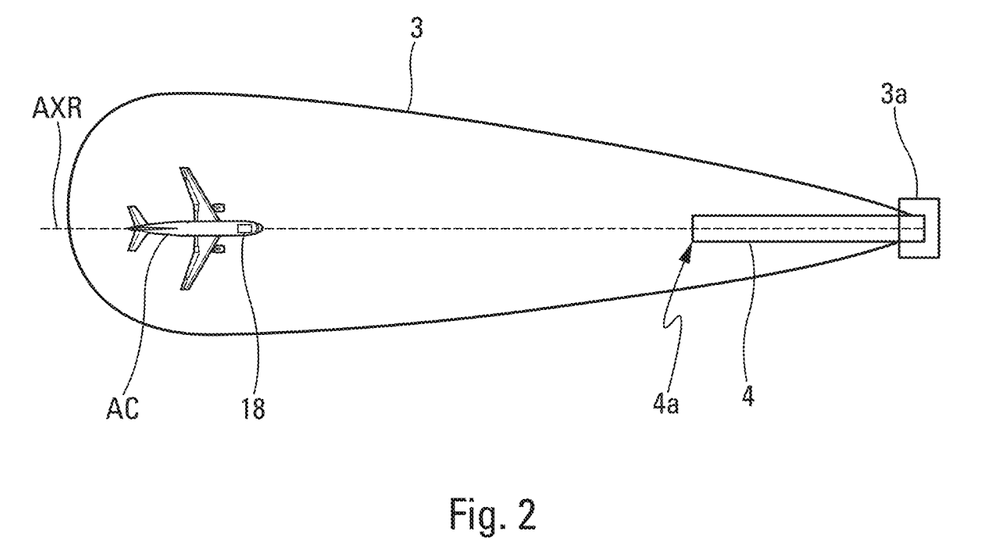
FIG. 2 corresponds to a schematic representation of a lateral guidance signal transmitted to an aircraft.

Moreover, as represented in FIG. 2, the reference lateral guidance signal 3 corresponds to a signal of Localizer signal type able to be transmitted to an aircraft AC by another ground emitting station 3a of the device for assisting the landing of the aircraft AC on a runway 4.

The device for assisting landing corresponds, for example, to an instrument landing system ILS.

Together, the guidance signals 2, 3 define a straight line exhibiting a slope θ with respect to a generally substantially horizontal plane containing the runway 4. This straight line corresponds to a reference approach trajectory AXR. This reference approach trajectory AXR represents an optimal trajectory that an aircraft AC must take in order to land under optimal conditions. The height between the plane containing the runway 4 and the reference approach trajectory AXR corresponds to a reference height (FIG. 3).

The vertical guidance signal 2 is representative of a reference vertical deviation $\Delta Z_{glide}$ between the position Pc of the aircraft AC and the reference approach trajectory AXR.

In the same manner, the lateral guidance signal 3 is representative of a reference lateral deviation $\Delta Y_{loc}$ between the position Pc of the aircraft AC and the reference approach trajectory AXR.

The guidance signals 2, 3 are received by the aircraft AC with the aid of a receiver 18 onboard the aircraft AC (FIGS. 1 and 2).

To verify that the vertical guidance signal 2 received by the receiver 18 is correct, it is preferable to be able to compare the measurement of the reference vertical deviation $\Delta Z_{glide}$ with respect to the reference approach trajectory AXR, defined by the guidance signals 2, 3, with a measurement of the evaluated vertical deviation $\Delta Z_{dev}$ of the aircraft AC with respect to an approach trajectory AX of the aircraft AC.

In order for the verification to make sense, it is preferable that the precision of the measurement of the evaluated vertical deviation $\Delta Z_{dev}$ be better than the acceptable errors in the reference vertical deviation $\Delta Z_{glide}$ that it is sought to verify.

To determine the evaluated vertical deviation $\Delta Z_{dev}$, the simplest scheme is to determine the height $H_{geo}$ of the aircraft AC, termed the geographical height, with respect to a threshold 4a of the runway 4 by ascertaining the slope θ of the reference approach trajectory AXR and the distance X to the runway 4 threshold 4a. The evaluated vertical deviation is deduced therefrom: $\Delta Z_{dev} = H_{geo} - X \tan \theta$.

A simple scheme for getting the geographical height $H_{geo}$ is to use the altitude $Z_{geo}$ of the aircraft AC relative to sea level 13 and the altitude of the runway $Z_T$: $H_{geo} = Z_{geo} - Z_T$.

To compute the geographical height $H_{geo}$, the following information is generally available:

$Z_T$ which is the altitude of the threshold 4a of the runway 4. This item of data is known since it is published by the states. It can therefore be considered to be known with a very good precision of the order of 1 foot (about 30.5 cm);

$Z_{GPS}$ which is the altitude of the aircraft AC relative to sea level 13 measured by a satellite-based geo-positioning system (GPS for "Global Positioning System"). This quantity is available but the error is generally too big (of the order of 300 feet, about 91.5 m) to be able to be usable without correction;

$Z_{baro}$ which is the barometric altitude of the aircraft AC measured by an atmospheric pressure probe system. This measurement uses a standard atmosphere model which may be significantly different from reality if the conditions of the flight differ from this model, in particular if the temperature differs from that of the international standard atmosphere (ISA) which is of the order of 15° C. and therefore cannot be used without correction.

$H_{RA}$ which is the height of the aircraft AC relative to the ground measured by a radio altimeter 50. This quantity is very precise, of the order of a foot (about 30.5 cm) for low heights, but, of course, it depends on the shape of the terrain upstream of the threshold 4a of the runway 4 which may differ from one approach to another.

Hence, none of the directly accessible measurements has sufficient precision to be able to determine the geographical height $H_{geo}$ or the geographical altitude $Z_{geo}$ and thus to be able to determine, on the basis of available measurements, the evaluated vertical deviation $\Delta Z_{dev}$ in order to compare it with the reference vertical deviation $\Delta Z_{glide}$. It may be noted that the two items of information which can be known with the best precision are the runway altitude $Z_T$ and the height $H_{RA}$ measured by the radio altimeter 50.

The verification method of the invention makes it possible to determine with sufficient precision the evaluated vertical deviation $\Delta Z_{dev}$ on the basis of the available information.

The verification device 1, represented in FIG. 8, comprises a measurement module 5 MEAS1 (MEAS for "measurement module") configured to measure at least one position parameter of an aircraft AC and a parameter corresponding to the vertical guidance signal 2, in an automatic and repetitive manner during an approach to the runway 4, during at least one flight of the aircraft AC along the approach trajectory AX of the aircraft AC. The measurement module 5 is embedded onboard at least one aircraft AC.

The verification device 1 also comprises a memory 110 configured to record at least one position parameter of an aircraft AC and a parameter corresponding to the vertical guidance signal 2.

Furthermore, the verification device comprises a computation module 6 COMP1 (COMP for "computation module") configured to compute a geographical height $H_{geo}$ of an aircraft AC with respect to the runway 4 on the basis of position parameters of the aircraft AC. This computation module 6 is configured to compute the geographical height $H_{geo}$ in an automatic and repetitive manner after the flight of at least one aircraft AC, for each of a plurality of different distances X with respect to a threshold 4a of the runway 4 along the approach trajectory AX of the aircraft AC.

The threshold 4a of the runway 4 corresponds to an entrance of the runway 4 on the basis of which the aircraft AC can land.

The verification device 1 also comprises a computation module 7 COMP2 configured to compute an evaluated vertical deviation $\Delta Z_{dev}$, corresponding to a difference between the geographical height $H_{geo}$ and a reference height. This computation is carried out in an automatic and repetitive manner after the flight of at least one aircraft AC, for each of a plurality of different distances X with respect to the threshold 4a of the runway 4 along the approach trajectory AX of the aircraft AC.

For example, the evaluated vertical deviation $\Delta Z_{dev}$ is computed with the aid of the following equation: $\Delta Z_{dev} = H_{geo} - X \tan \theta$, in which:

X is the distance with respect to the threshold 4a of the runway 4, and $\theta$ is the slope between the reference approach trajectory AXR and a generally substantially horizontal plane comprising the runway 4.

The verification device furthermore comprises a computation module 8 COMP3 configured to compute a vertical error on the basis of a comparison between the evaluated vertical deviation $\Delta Z_{dev}$ and the reference vertical deviation $\Delta Z_{glide}$ determined as a function of the parameter corresponding to the vertical guidance signal 2. This computation is carried out in an automatic and repetitive manner after the flight of at least one aircraft AC, for each of a plurality of different distances X with respect to a threshold 4a of the runway 4 along the approach trajectory AX of the aircraft AC.

The measurement module 5, as represented in FIG. 8, comprises at least one of the following elements:

a radio altimeter 50 embedded onboard configured to measure a height $H_{RA}$ of the aircraft AC relative to the ground, a barometric altimeter 52 embedded onboard configured to measure a barometric height $H_{baro}$ of the aircraft AC, a geolocation module 51 embedded onboard configured to measure an altitude $Z_{GPS}$ of the aircraft AC, sensors 53 embedded onboard configured to measure a total air temperature and a Mach number of the aircraft AC, a memory 110 configured to store at least the measured heights $H_{baro}$ and $H_{RA}$, the measured altitude $Z_{GPS}$, the measured temperature, the measured Mach number and the vertical guidance signal 2 received by the receiver 18 embedded onboard.

Thus, the position parameters of the aircraft AC comprise at least one of the following quantities:

a height $H_{RA}$ of the aircraft AC relative to the ground, a barometric height $H_{baro}$ of the aircraft AC, an altitude $Z_{GPS}$ of the aircraft AC, a total air temperature, a Mach number.

These quantities are stored in the memory 110 so that they can be used on the ground after the flight of at least one aircraft AC.

According to one embodiment, the geolocation module 51 comprises a GPS which measures the altitude $Z_{GPS}$ and the position of the aircraft AC. In a variant of this embodiment, the position of the aircraft AC is stored in the memory 110 so that it can be used on the ground after the flight of the aircraft AC. On the ground, the distance X to the runway 4 threshold 4a is then computed by a computation module by calculating the difference between the aircraft's position measured by the GPS and the position of the runway 4 threshold 4a. In another variant of this embodiment, the distance X to the runway 4 threshold 4a is computed by a computation module of the geolocation module 51 so as to be stored in the memory 110.

According to another embodiment, the geolocation module comprises a GPS which measures the altitude $Z_{GPS}$ and a distance measurement device (DME for "distance measuring equipment") which measures the distance X between the position of the aircraft AC and the position of the runway 4 threshold 4a by radioelectric pulses. The distance X to the runway 4 threshold 4a is then stored in the memory 110 so that it can be used on the ground after the flight of the aircraft AC.

According to one embodiment, the computation module 6 comprises a computation sub-module 9 COMP1A configured to compute, for each of a plurality of different distances X with respect to the threshold 4a of the runway 4 along the approach trajectory AX of the aircraft AC, a geographical height $H_{geo}$ computed on the basis of the position parameters of the aircraft AC.

According to a first variant, the computation sub-module 9 is configured to compute the geographical height $H_{geo}$ on the basis of the sum, on the one hand, of the reference vertical deviation $\Delta Z_{glide}$ and, on the other hand, of the product of the distance X with respect to the threshold 4a of the runway 4 and of the tangent of the slope $\theta$ of the reference approach trajectory AXR. This computation is carried out for each of a plurality of different distances X with respect to the threshold 4a of the runway 4 along the approach trajectory AX of the aircraft AC.

According to this first variant, the computation module 6 also comprises a computation sub-module 10 COMP1B configured to compute, on the basis of the geographical height $H_{geo}$, a reference terrain profile PT along the approach trajectory AX of an aircraft AC. This reference terrain profile PT represents an evolution of a height of the terrain before the threshold 4a of the runway 4 as a function of the distance X with respect to the threshold 4a of the runway.

According to one embodiment, this computation sub-module 10 is configured to:

for each of a plurality of different distances X with respect to the threshold 4a of the runway 4 along the approach trajectory AX of the aircraft AC, compute a terrain height corresponding to the difference between the geographical height $H_{geo}$ and the height $H_{RA}$ measured by the radio altimeter 50, for the set of the plurality of different distances X with respect to the threshold 4a of the runway 4 along the approach trajectory AX of the aircraft AC:

compute at least one auxiliary terrain profile on the basis of the set of the computed terrain heights for the set of different distances X, compute a reference terrain profile PT with the aid of the auxiliary terrain profile.

Moreover, the computation module 6 comprises a computation sub-module 11 COMP1C configured to compute an offset $\Delta X$ between the reference terrain profile PT and a terrain profile Prof determined on the basis of heights $H_{RA}$ measured by the radio altimeter 50.

The offset $\Delta X$ can be computed by the computation sub-module 11 through a correlation between the terrain profile Prof determined on the basis of the heights $H_{RA}$ measured by the radio altimeter 50 and the reference terrain profile. The offset $\Delta X$ computed is considered to be constant.

Figure 4:
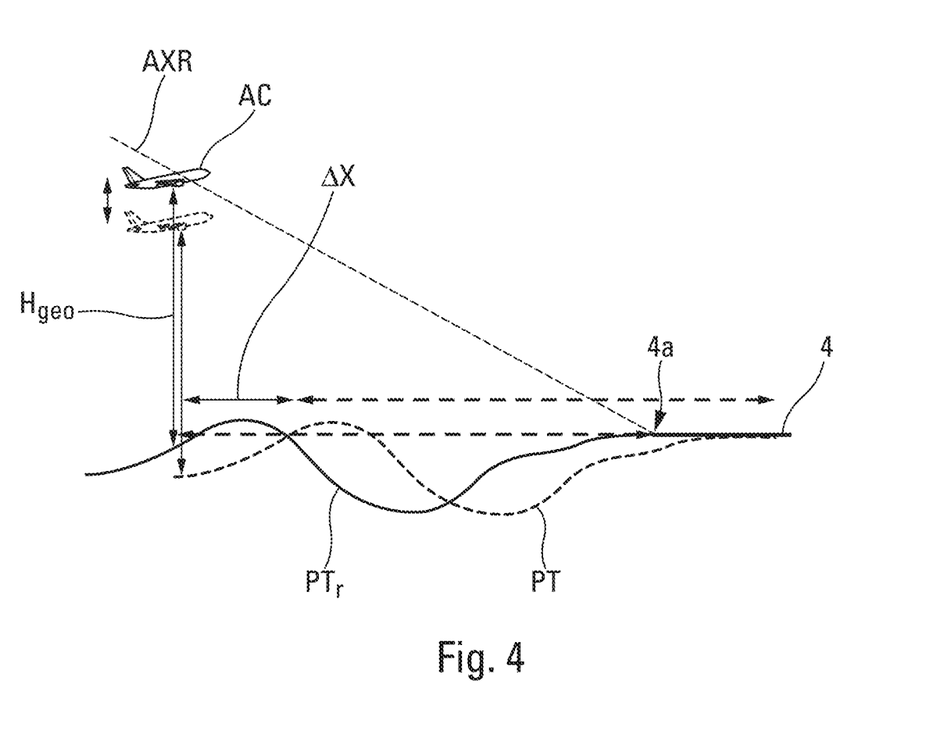
FIG. 4 corresponds to a schematic representation of an aircraft during an approach to a landing runway depicting an offset of the terrain profile upstream of a threshold of the landing runway.

Furthermore, the computation module 6 comprises a computation sub-module 12 COMP1D configured to set the reference terrain profile PT on the terrain profile Prof determined on the basis of heights $H_{RA}$ measured by the radio altimeter 50 by subtracting the computed offset $\Delta X$ from each distance X with respect to the threshold 4a of the runway 4. Thus, as a function of the sign of the offset computed by the computation sub-module 11, the absolute value of the computed offset is subtracted from or added to the distance X as represented in FIG. 4.

The computation is carried out with the aid of the following equation:

$$H_{geo}(X) = H_{RA}(X - \Delta X) + \text{Prof}(X).$$

This setting makes it possible to circumvent a possible positioning error in the determination of the distance X of the runway 4 threshold 4a. Indeed, a positioning error would amount to using the terrain profile at a false distance with respect to the runway 4 threshold 4a and therefore to engendering an error in the computation of the geographical height $H_{geo}$ and in the evaluated vertical deviation $Z_{dev}$.

The first variant assumes that one has constructed a reference terrain profile PT before the runway 4 along the approach trajectory. This profile PT can easily be initially constructed on the basis of the reference vertical deviation $\Delta Z_{glide}$ by using flights of aircraft AC shortly after an inspection has demonstrated that this deviation $\Delta Z_{glide}$ was correctly calibrated using traditional procedures. Under these conditions, it is reasonable to make the assumption that the reference vertical deviation $\Delta Z_{glide}$ is correct and therefore can be used to construct the reference profile PT.

By virtue of this reference profile PT, and with the aid of the radio altimeter 50 and of the aircraft AC position information, it is possible to evaluate the precision and the quality of the Glide slope signal 2 by using the flight data and an algorithm for post-processing these data.

According to a second variant, the computation submodule 9 is configured to:

compute a measurement error constant $\Delta H$ engendered by the geolocation module 51 in the altitude measurement, the error constant $\Delta H$ being computed when the aircraft AC touches the ground and/or is measured by the radio altimeter 50 when the aircraft AC passes above the runway 4 threshold 4a.

compute a geographical height $H_{GPS}$ measured by the geolocation module 51 which corresponds to the difference between the altitude $Z_{GPS}$ measured by the geolocation module 51 and an altitude $Z_T$ of the runway 4 threshold 4a, stored in the memory 110, compute the geographical height $H_{geo}$ which corresponds to the difference between the geographical height $H_{GPS}$ measured by the geolocation module 51 and the error constant $\Delta H$ engendered by the geolocation module 51.

This computation is carried out for each of a plurality of different distances X with respect to the threshold 4a of the runway 4 along the approach trajectory AX of the aircraft AC with the aid of the following equation: $H_{geo}(X)=H_{GPS}(X)+\Delta N$.

This second variant makes the assumption that the altitude $Z_{GPS}$ measured by the geolocation module 51 is marred by a constant measurement error in the course of the approach of the aircraft AC on the runway 4. Hence, when the aircraft AC is on the ground, it is possible to determine this measurement error and to deduct it from the measurements taken by the geolocation module 51.

According to a third variant, the computation sub-module 9 is configured to:

estimate, with the aid of the total air temperature and of the Mach number measured by the sensors 53 as well as of the barometric height $H_{baro}$, a variation of the static temperature $L_{est}$, dependent on the altitude, and a ground temperature $T_{est}$, compute the geographical height $H_{geo}$ with the aid of the barometric height $H_{baro}$ and of the variation of the static temperature $L_{est}$ and of the ground temperature $T_{est}$.

This computation is carried out for each of a plurality of different distances X with respect to the threshold 4a of the runway 4 along the approach trajectory AX of the aircraft AC.

In this third variant, the geographical height $H_{geo}$ (in meters) can be computed with the aid of the following equation:

$$H_{geo} = \frac{T_{est}/(L_{est} \times K)}{1 - [(T_0 - L_0 \times H_{baro} \times K)/T_0]^{L_{est}/L_0}}$$

in which, in addition to the aforementioned parameters:

$L_0$ is a variation of the static temperature, as a function of altitude, of a standard atmosphere model, $T_0$ is a reference temperature (in Kelvin) of the standard atmosphere model, K is a dimensionless constant.

K is in particular substantially equal to 0.3048.

The above equation uses an international standard atmospheric model (ISA for "International Standard Atmosphere").

All these variants are not exclusive. They can be mutually combined as a function of the data available aboard the aircraft AC.

The modules described above make it possible to verify the vertical guidance signal 2.

Thus in a very advantageous manner, it is possible to compare the measurements of reference vertical deviation $\Delta Z_{glide}$ and the evaluated vertical deviation $\Delta Z_{dev}$ by using flight data available aboard the aircraft AC and to deduce therefrom an estimation of the error of the vertical guidance signal 2.

In an advantageous manner, the regular flights operating on a given runway can all be used to regularly verify the quality of the vertical guidance signal 2 along the approach. As all the aircraft AC do not follow the same approach trajectory T1, T2, T3, T4 (FIG. 5) since the capture altitude depends on the surrounding traffic, on the capability of the aircraft AC, on the temperature that day, etc., a great diversity of trajectories T1, T2, T3, T4 can therefore be performed in-flight over a given terrain.

Figure 5:
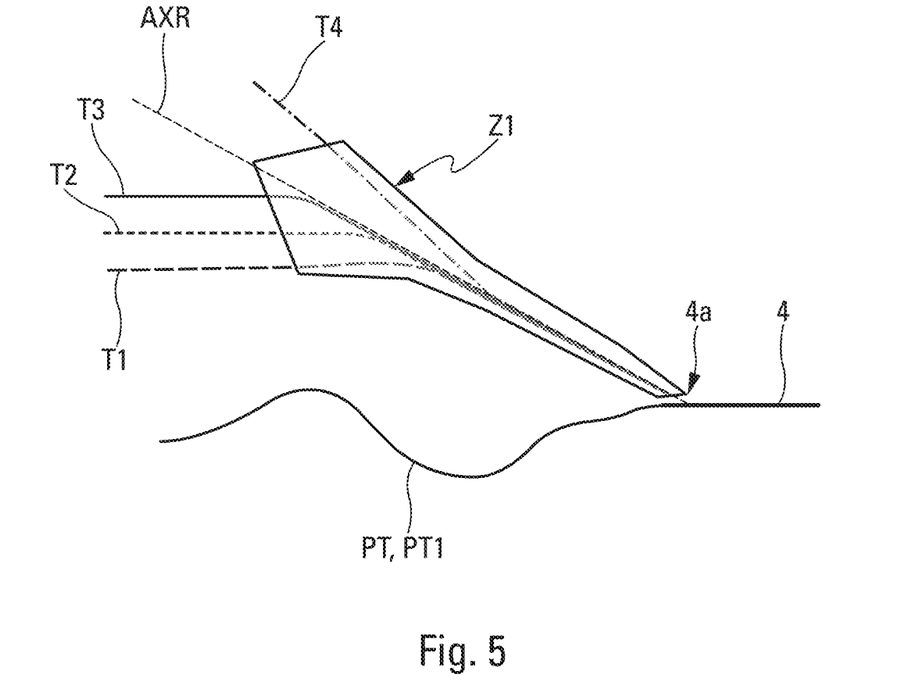
FIG. 5 corresponds to a schematic representation of a zone whose vertical guidance signal has been verified.

Hence, if a large number of flights are utilized, it is possible to determine a zone Z1 (a volume in space) where the vertical guidance signal 2 has been able to be verified by the method described above. In each point of this zone Z1, it is possible to determine the precision of the vertical guidance signal 2 and the number of flights which have made it possible to determine this precision.

Also in an advantageous manner, it becomes needless to carry out a trial flight in the zone Z1 where the quality of the signal has been considered to be compliant. Only the zones where the signal has not been verified, or if it turns out that the signal is non-compliant at a given location, will require a specific flight. Hence the proposed method makes it possible to significantly reduce the number and/or the frequency of the test flights in respect of the installations emitting a vertical guidance signal 2, or indeed to dispense with them completely if it is possible to demonstrate that the available data cover the whole zone which is to be verified. The bigger the number of flights considered by the analysis, the bigger the zone covered will be, thus generating significant advantages.

In a very advantageous manner, the verification device uses only data actually available aboard aircraft AC currently in service which are already utilized by airlines for other uses and therefore modifies neither the systems aboard the aircraft AC, nor the approach procedures, nor the maintenance procedures.

In an advantageous manner, by this technique implemented by the verification device, the vertical guidance signal 2 is verified mainly where it is most liable to be used, that is to say where most of the flights are performed.

In an advantageous manner, by this technique, it is also possible to detect more rapidly than today a defect of the ground station emitting the vertical guidance signal 2. Indeed, inspections of the signal are usually made every six months, whilst the method makes it possible to detect an error as soon as a flight is carried out under conditions where the vertical guidance signal 2 becomes out of tolerance.

In a manner equivalent to the verification of the vertical guidance signal 2, in order to verify the lateral guidance signal 3, it is preferable to be able to compare the measurement of the reference lateral deviation $\Delta Y_{loc}$ with a measurement of the evaluated lateral deviation $\Delta Y_{dev}$. In order for the verification to make sense, it is preferable that the precision of the measurement of the evaluated lateral deviation $\Delta Y_{dev}$ be better than the acceptable errors in the reference lateral deviation $\Delta Y_{loc}$ that it is sought to verify.

The following modules make it possible to verify the lateral guidance signal 3.

Figure 6:
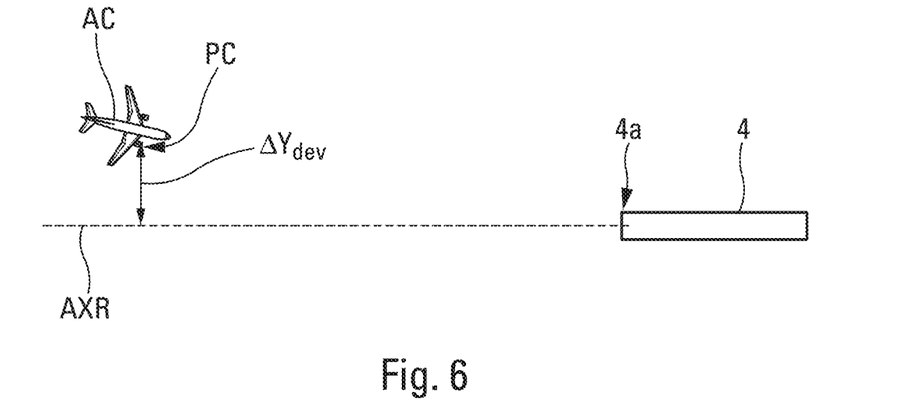
FIG. 6 corresponds to a schematic representation of an aircraft during an approach to a landing runway depicting a lateral deviation.

According to one embodiment, the verification device 1 furthermore comprises a measurement module 14 MEAS2, onboard at least one aircraft AC, for measurement in an automatic and repetitive manner, during an approach to the runway 4. The measurement module 14 is configured to measure and to record in the memory 110 at least one geographical position 16a of the aircraft AC, termed the measured geographical position (FIG. 6), and a parameter corresponding to the lateral guidance signal 3.

This measurement module 14 comprises, for example, a satellite-based geo-positioning system augmented with a space augmentation system (SBAS for "Satellite-Based Augmentation System"). Indeed, the precision originating from the satellite-based geo-positioning system alone might not be sufficient.

The verification device 1 furthermore comprises:
a computation module 15 COMP4 configured to compute a lateral deviation $\Delta Y_{dev}$, termed the evaluated lateral deviation, between the measured geographical position 16a and a projected position 16b corresponding to the projection of the measured geographical position 16a onto the reference approach trajectory AXR,
a computation module 16 COMP5 configured to compute a lateral error on the basis of a comparison between the evaluated lateral deviation $\Delta Y_{dev}$ and the reference lateral deviation $\Delta Y_{loc}$ determined as a function of the parameter corresponding to the lateral guidance signal 3.

Figure 9:
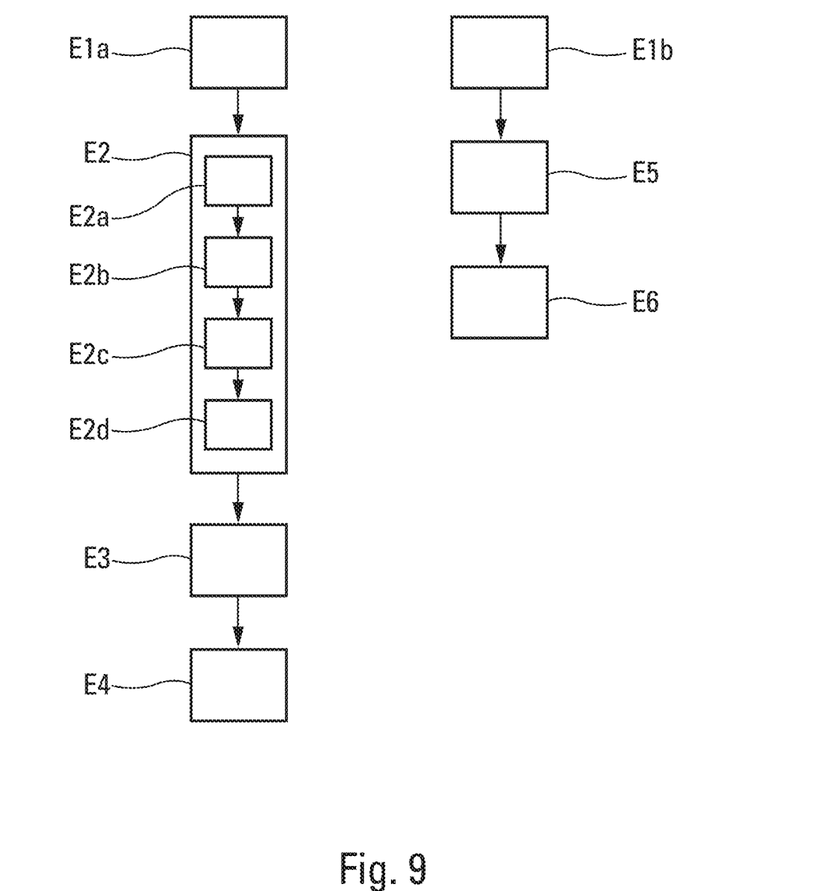
FIG. 9 represents a schematic diagram of the verification method according to one embodiment.

The verification device 1, as described above, implements steps of a method for verifying a vertical guidance signal 2 and a lateral guidance signal 3 (FIG. 9). The signals are able to be transmitted to at least one aircraft AC.

The method comprises a first measurement step E1a, implemented by at least the measurement module 5 onboard at least one aircraft AC, in an automatic and repetitive manner, during at least of a flight of the aircraft AC along an approach trajectory AX of the aircraft AC, during an approach to the runway 4.

The first measurement step E1a comprises measuring and recording in a memory 110 at least one position parameter of an aircraft AC and a parameter corresponding to the vertical guidance signal 2.

The method furthermore comprises a first set of steps implemented after the flight of at least one aircraft AC in an automatic and repetitive manner.

The first set of steps comprises, for each of a plurality of different distances X with respect to a threshold 4a of the runway 4 along the approach trajectory AX of the aircraft AC:
a height computation step E2, implemented by a computation module 6, comprising computing a geographical height $H_{geo}$ of an aircraft AC with respect to the runway 4 on the basis of the aircraft position parameters AC,
a vertical deviation computation step E3, implemented by a computation module 7, comprising computing a vertical deviation $\Delta Z_{dev}$, termed the evaluated vertical deviation, between the geographical height $H_{geo}$ and a reference height,
a vertical error computation step E4, implemented by a computation module 8, comprising computing a vertical error on the basis of a comparison between the evaluated vertical deviation $\Delta Z_{dev}$ and the reference vertical deviation $\Delta Z_{glide}$ determined as a function of the parameter corresponding to the vertical guidance signal 2.

According to one embodiment, the first measurement step E1a comprises performing at least one of the following actions:
measuring a height $H_{RA}$ relative to the ground with the aid of a radio altimeter 50 embedded onboard forming part of the measurement module 5,
measuring a barometric height $H_{baro}$ of the aircraft AC with the aid of a barometric altimeter 52 embedded onboard forming part of the first measurement module 5,
measuring an attitude $Z_{GPS}$ of the aircraft AC and determining the distance X to the runway 4 threshold 4a with the aid of a geolocation module 51 embedded onboard forming part of the first measurement module 5,
measuring a total air temperature and a Mach number of the aircraft AC with the aid of sensors 53 embedded onboard forming part of the first measurement module 5,
storing the heights $H_{baro}$, $H_{RA}$, the altitude $Z_{GPS}$, the temperature, the Mach number, the distance X to the runway 4 threshold 4a and the reference vertical deviation in a memory 110.

According to one embodiment, the first measurement step E1a furthermore comprises measuring the position of the aircraft AC. In a variant of this embodiment, the first step E1a also comprises storing the position of the aircraft AC in the memory 110 so that it can be used on the ground after the flight of the aircraft AC in order to compute on the ground the distance X to the runway 4 threshold 4a. In another variant of this embodiment, the first measurement step E1a also comprises computing the distance X to the runway 4 threshold 4a with a computation module of the geolocation module 51 so as to be stored in the memory 110.

According to another embodiment, the first step E1a furthermore comprises measuring the distance X between the position of the aircraft AC and the position of the runway 4 threshold 4a with a distance measurement device so as to be stored in the memory 110 so that it can be used on the ground after the flight of the aircraft AC.

According to one embodiment, the height computation step E2 comprises a sub-step E2a of computing geographical height $H_{geo}$, implemented by a computation sub-module 9, comprising computing, for each of a plurality of different distances X with respect to the threshold 4a of the runway 4 along the approach axis AX of the aircraft AC, a geographical height $H_{geo}$ on the basis of the position parameters of the aircraft AC.

According to a first variant, sub-step E2a of computing geographical height $H_{geo}$ comprises, for each of a plurality of different distances X with respect to the threshold 4a of the runway 4 along the approach trajectory AX of the aircraft AC computing the geographical height $H_{geo}$ of the aircraft AC corresponding to the sum, on the one hand, of the reference vertical deviation $Z_{glide}$ and, on the other hand, of the product of the distance X with respect to the threshold 4a of the runway 4 and of the tangent of the slope θ of the reference approach trajectory AXR.

The height computation step E2 furthermore comprises:

a sub-step E2b of reference terrain profile computation, implemented by a computation sub-module 10, comprises computing, on the basis of the geographical height $H_{geo}$, a reference terrain profile PT along an approach axis AX of an aircraft AC, the terrain profile PT representing an evolution of a height of the terrain before the threshold 4a of the runway 4 as a function of the distance X with respect to the threshold 4a of the runway 4, a sub-step E2c of computing an offset of the reference terrain profile, implemented by a computation sub-module 11 comprises computing an offset between the reference terrain profile PT and a terrain profile Prof determined on the basis of heights $H_{RA}$ measured by the radio altimeter 50, a sub-step E2d of computing a straightened terrain profile PTr, implemented by a computation sub-module 12, comprising setting the reference terrain profile PT on the terrain profile Prof determined on the basis of heights $H_{RA}$ measured by the radio altimeter 50 by subtracting the computed offset from each distance X with respect to the threshold 4a of the runway 4.

According to one embodiment, the sub-step E2b of reference terrain profile computation comprises, for each of a plurality of different distances X with respect to the threshold 4a of the runway 4 along the approach trajectory AX of the aircraft AC, computing a terrain height corresponding to the difference between the geographical height $H_{geo}$ and the height $H_{RA}$ measured by the radio altimeter 50, for the set of the plurality of different distances X with respect to the threshold 4a of the runway 4 along the approach trajectory AX of the aircraft AC:

computing at least one auxiliary terrain profile on the basis of the set of computed terrain heights for the set of different distances X, computing a reference terrain profile PT with the aid of the auxiliary terrain profile.

According to a second variant, sub-step E2a of computing geographical height $H_{geo}$ comprises, for each of a plurality of different distances X with respect to the threshold 4a of the runway 4 along the approach axis AX of the aircraft AC:

computing a measurement error constant ΔH engendered by the geolocation module 51 in the altitude measurement, the error constant ΔH being computed when the aircraft AC touches the ground and/or being measured by the radio altimeter 50 when the aircraft AC passes above the threshold 4a of the runway 4, computing a geographical height $H_{GPS}$ measured by the geolocation module 51 corresponding to the difference between the altitude $Z_{GPS}$ measured by the geolocation module 51 and an altitude $Z_T$ of the runway 4 threshold 4a, stored in the memory 110, computing the geographical height $H_{geo}$ corresponding to the difference between the geographical height $H_{GPS}$ measured by the geolocation module 51 and the error constant ΔH engendered by the geolocation module 51.

According to a third variant, sub-step E2a comprises, for each of a plurality of different distances X with respect to the threshold 4a of the runway 4 along the approach trajectory AX of the aircraft AC:

estimating, with the aid of the total air temperature, of the Mach number and of the barometric height $H_{baro}$, a variation of the static temperature $L_{est}$ dependent on the altitude and a ground temperature, computing a height measured with the aid of the barometric height $H_{baro}$ and of the variation of the static temperature $L_{est}$ and of the ground temperature.

According to a particular feature, the method furthermore comprises:

a second measurement step E1b implemented by a measurement module 14, on at least one aircraft AC, in an automatic and repetitive manner, during an approach to the runway 4, the second measurement step E1b consisting in measuring and in recording in the memory 110 at least one geographical position 16a of the aircraft AC, termed the measured geographical position, and a parameter corresponding to the lateral guidance signal 3;

a second set of steps implemented after the flight of the aircraft AC in an automatic and repetitive manner, the second set of steps comprising:

a lateral deviation computation step E5, implemented by a computation module 15, consisting in computing a lateral deviation $\Delta Y_{dev}$, termed the evaluated lateral deviation, between the measured geographical position 16a and a projected position 16b corresponding to the projection of the measured geographical position 16a onto the reference approach trajectory AXR, a lateral error computation step E6, implemented by a computation module 16, comprises computing a lateral error on the basis of a comparison between the evaluated lateral deviation $\Delta Y_{dev}$ and the reference lateral deviation $\Delta Y_{loc}$ determined as a function of the parameter corresponding to the lateral guidance signal 3.

According to another particular feature, measurement step E1b furthermore comprises storing the geographical position or positions 16a and the lateral guidance signal 3 in a memory 110.

In a particular embodiment, the computation modules 6, 7, 8, 15, 16 and computation sub-modules 9, 10, 11, 12 form part of a central unit. By way of example, the modules can correspond to algorithms implemented in a software manner in the central unit 1.

In an advantageous manner similar to the vertical guidance signal 2, it is possible to use numerous flights which have different approach trajectories F1, F2, F3, F4 (FIG. 7) and to determine all of the zone which has been able to be covered by the trajectories performed by all of the analyzed flight data.

Figure 7:
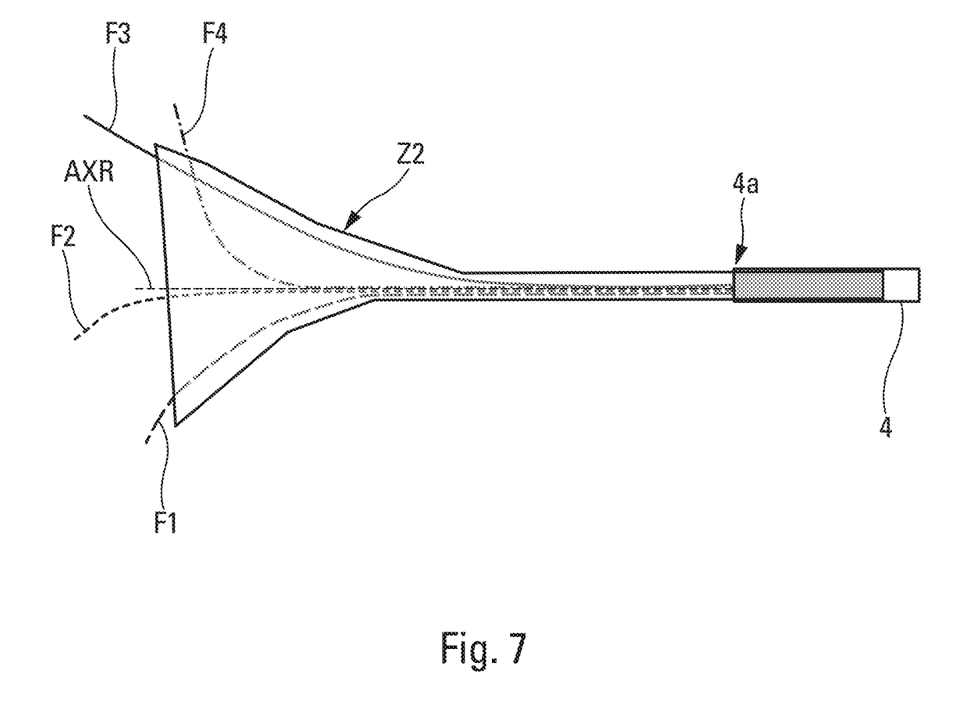
FIG. 7 corresponds to a schematic representation of a zone whose lateral guidance signal has been verified.

Hence in an advantageous manner, it becomes needless to carry out a trial flight in the zone Z2 where the quality of the signal has been considered to be compliant as represented in FIG. 7. Only the zones where the signal has not been verified, or, if it turns out that the signal is non-compliant at a given location, will require a specific flight. Hence, the proposed method makes it possible to significantly reduce the number of flights and/or of tests with a van, or indeed to dispense with them completely if one succeeds in demonstrating that the available data cover the zone Z2 which is to be verified. The bigger the number of flights considered by the analysis, the bigger the zone covered Z2 will be, therefore generating significant advantages.

In a very advantageous manner, this method uses only data currently available aboard aircraft in service provided with receivers having an SBAS capability, which are already utilized by airlines for other uses, and modifies neither the systems aboard the aircraft, nor the approach procedures, nor the maintenance procedures.

In an advantageous manner, by this technique, the lateral guidance signal 3 is verified mainly where it is most liable to be used, that is to say where most flights are performed.

In an advantageous manner, it is also possible with this technique to detect a defect more rapidly than today. Indeed, inspections of the signal are usually made every six months, while the method makes it possible to detect an error as soon as a flight is carried out under conditions where the lateral guidance signal 3 becomes out of tolerance.

Thus, the invention described above makes it possible to use data stored by the aircraft of the airlines in order to carry out a systematic verification of the vertical guidance signal 2 and the lateral guidance signal 3.

The proposed scheme uses only data available on aircraft which are currently in service. Moreover, the process for recovering these data for analysis exists since the airlines must analyze all flights to detect possible drifts of the procedures in service. Therefore, the proposed method requires neither modification of aircraft in service, nor modification of the process for recovering flight data. It makes do with using data which are currently available.

Therefore, the cost of producing data for verifying signals over all terrains where a fleet of aircraft is operated is very low relative to the cost of a regular checking trial flight over each of these terrains.

Verifying the precision and quality of the vertical guidance signal 2 and the lateral guidance signal 3 with the aid of airlines' aircraft data affords the following advantages:
  certain specific verification flights can be dispensed with,
  more frequent verifications of the signal can be carried out and flight safety may be increased in the case where an installation delivering the signals is degraded and where the scheduled next check is quite some time away,
  reduced number of airport runway closures, insofar as the specific verification carried out to date requires the closure of the runway to commercial flights.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining an error in at least one guidance signal representative of a reference deviation between a position of an aircraft and a reference approach trajectory including a vertical guidance signal representative of a reference vertical deviation from the reference approach trajectory, the signals being transmittable to the aircraft each by a ground emitter device to assist the aircraft with landing on a runway, comprising:
  measuring and recording in a memory, in a first measurement step, implemented by at least one first measurement module onboard at least one aircraft, in an automatic and repetitive manner, during at least one flight of the aircraft along an approach trajectory of the aircraft, during an approach to the runway, the measuring and recording being of at least one position parameter of the aircraft and a parameter corresponding to the vertical guidance signal;
  implementing a first set of steps, after the flight of the at least one aircraft, in an automatic and repetitive manner, the first set of steps comprising, for each of a plurality of different distances with respect to a threshold of the runway along the approach trajectory of the aircraft:
  a height computation step, implemented by a first computation module, comprising computing a geographical height of an aircraft with respect to the runway on the basis of the position parameters of an aircraft,
  a vertical deviation computation step, implemented by a second computation module, comprising computing a vertical deviation, termed the evaluated vertical deviation, between the geographical height and a reference height,
  a vertical error computation step, implemented by a third computation module, comprising computing a vertical error on the basis of a comparison between the evaluated vertical deviation and the reference vertical deviation determined as a function of the parameter corresponding to the vertical guidance signal.

2. The method as claimed in claim 1, wherein the evaluated vertical deviation is computed with the aid of the following equation: $\Delta Z_{dev} = H_{geo} - X \tan \theta$, in which:
  X is the distance with respect to the threshold of the runway along an approach trajectory of the aircraft,
  $\theta$ is the slope between the reference approach trajectory and a plane comprising the runway, and
  $H_{geo}$ is the geographical height of the aircraft.

3. The method as claimed in claim 1, wherein
  the first measurement step comprises:
    measuring a height relative to the ground with the aid of a radio altimeter embedded onboard forming part of the first measurement module,
    measuring an attitude of the aircraft with the aid of a geolocation module embedded onboard forming part of the first measurement module,
    storing the height, the altitude and the reference vertical deviation in a memory;
  the height computation step comprising:
    a sub-step of computing the geographical height comprising, for each of a plurality of different distances with respect to the threshold of the runway along the approach trajectory of the aircraft, in computing, as the geographical height of the aircraft, the sum of the reference vertical deviation and the product of a current one of the plurality of different distances with respect to the threshold of the runway and of a tangent of a slope of the reference approach trajectory;
    a sub-step of computing a reference terrain profile, implemented by a second computation sub-module, comprising computing, on the basis of the geographical height, a reference terrain profile along an approach axis of an aircraft, the terrain profile representing an evolution of a height of the terrain before the threshold of the runway as a function of the distance with respect to the threshold of the runway,
    a sub-step of computing an offset of the reference terrain profile, implemented by a third computation sub-module, comprising computing an offset between the reference terrain profile and a terrain profile determined on the basis of heights measured by the radio altimeter, a sub-step of computing a straightened terrain profile, implemented by a fourth computation sub-module, comprising setting the reference terrain profile on the terrain profile determined on the basis of heights measured by the radio altimeter by subtracting the computed offset from each distance with respect to the threshold of the runway.

4. The method as claimed in claim 3, wherein the geographical height is computed with the aid of the following equation:

$H_{geo}(X) = H_{RA}(X - \Delta X) + \text{PrOf}(X)$, in which:

X is the distance with respect to the threshold of the runway,

ΔX is the offset between the reference terrain profile and the terrain profile determined on the basis of heights measured by the radio altimeter, $H_{RA}(X)$ is the height measured by the radio altimeter at a distance X with respect to the threshold of the runway, Prof(X) is the terrain profile determined on the basis of heights measured by the radio altimeter as a function of the distance X with respect to the threshold of the runway.

5. The method as claimed in claim 1, wherein:
the first measurement step furthermore comprises:
measuring an attitude of the aircraft with the aid of a geolocation module embedded onboard forming part of the first measurement module,
storing the altitude and the reference vertical deviation in a memory;
the height computation step comprises:
a sub-step of computing geographical height comprising, for each of a plurality of different distances with respect to the threshold of the runway along the approach axis of the aircraft:
computing an error constant due to the geolocation module in the altitude measurement, the error constant being at least one of computed by when the aircraft touches the ground or measured by the radio altimeter when the aircraft passes above the threshold of the runway,
computing a geographical height measured by the geolocation module corresponding to the difference between the altitude measured by the geolocation module and an altitude of the threshold of the runway, stored in a memory,
computing the geographical height corresponding to the difference between the geographical height measured by the geolocation module and the error constant engendered by the geolocation module.

6. The method as claimed in claim 5, wherein the geographical height is computed with the aid of the following equation: $H_{geo}(X) = H_{GPS}(X) + \Delta H$ in which:

X is the distance with respect to the threshold of the runway, $H_{GPS}(X)$ is the height measured by the geolocation module, ΔH is the error constant engendered by the geolocation module.

7. The method as claimed in claim 1, wherein
the first measurement step further comprises:
measuring a barometric height of the aircraft, with the aid of a barometric altimeter embedded onboard forming part of the first measurement module, measuring a total air temperature and a Mach number of the aircraft, with the aid of sensors embedded onboard forming part of the first measurement module, storing the barometric height, the temperature, the Mach number and the reference vertical deviation in a memory, the height computation step comprises:
a sub-step comprising, for each of a plurality of different distances with respect to the threshold of the runway along the approach trajectory of the aircraft:
estimating, with the aid of the total air temperature, the Mach number and of the barometric height, a variation of the static temperature dependent on the altitude and a ground temperature,
computing the geographical height with the aid of the barometric height, of the variation of the static temperature and of the ground temperature.

8. The method as claimed in claim 7, wherein the geographical height is computed with the aid of the following equation:

$$H_{geo} = \frac{T_{est}/(L_{est} \times K)}{1 - [(T_0 - L_0 \times H_{baro} \times K)/T_0]^{L_{est}/L_0}}$$

in which:

$H_{baro}$ is the barometric height, $L_{est}$ is the estimation of the variation of the static temperature dependent on the altitude, $L_0$ is a variation of the static temperature, as a function of altitude, of a standard atmosphere model, $T_{est}$ is the estimated temperature on the ground, $T_0$ is a reference temperature of the standard atmosphere model, K is a dimensionless constant.

9. The method as claimed in claim 1, wherein the first measurement step further comprises at least one of:
measuring the position of the aircraft so as to store the position of the aircraft in the memory; or
determining the distance to the runway threshold so as to store the distance to the runway threshold in the memory.

10. The method as claimed in claim 1, further comprising:
a second measurement step implemented by a second measurement module, on at least one aircraft, in an automatic and repetitive manner, during an approach to the runway, the second measurement step comprising measuring and recording in the memory at least one geographical position of the aircraft, termed the measured geographical position, and a parameter corresponding to a lateral guidance signal;
a second set of steps implemented after the flight of the aircraft, in an automatic and repetitive manner, the second set of steps comprising:
a lateral deviation computation step, implemented by a fourth computation module, comprising computing a lateral deviation, termed the evaluated lateral deviation, between the measured geographical position and a projected position corresponding to the projection of the measured geographical position onto the reference approach trajectory,
a lateral error computation step, implemented by a fifth computation module, comprising computing a lateral error on the basis of a comparison between the evaluated lateral deviation and a reference lateral deviation determined as a function of the parameter corresponding to the lateral guidance signal.

11. A device for determining an error in a vertical guidance signal representative of a reference vertical deviation and a lateral guidance signal representative of a reference lateral deviation, the signals being transmittable to an aircraft by a ground emitter device to assist the aircraft with landing on a runway, comprising:
- a first measurement module configured to measure at least one position parameter of an aircraft, in an automatic and repetitive manner, during at least one flight of the aircraft, and a parameter corresponding to the vertical guidance signal, during an approach to the runway, the first measurement module being embedded onboard at least one aircraft,
- a memory configured to record at least one position parameter of an aircraft and a parameter corresponding to the vertical guidance signal,
- a first computation module configured to compute a geographical height of an aircraft with respect to the runway on the basis of the position parameters of an aircraft, in an automatic and repetitive manner after the flight of at least one aircraft, for each of a plurality of different distances with respect to a threshold of the runway along an approach trajectory of the aircraft,
- a second computation module configured to compute an evaluated vertical deviation, between the geographical height and a reference height, in an automatic and repetitive manner after the flight of at least one aircraft, for each of a plurality of different distances with respect to a threshold of the runway along the approach trajectory of the aircraft,
- a third computation module configured to compute a vertical error on the basis of a comparison between the evaluated vertical deviation and the reference vertical deviation determined as a function of the parameter corresponding to the vertical guidance signal, in an automatic and repetitive manner after the flight of at least one aircraft, for each of a plurality of different distances with respect to a threshold of the runway along the approach trajectory of the aircraft.

12. The device as claimed in claim 11, wherein the first measurement module comprises:
- a radio altimeter embedded onboard configured to measure a height of the aircraft relative to the ground,
- a memory configured to store the heights measured by the radio altimeter.

13. The device as claimed in claim 11, wherein the first computation module further comprises:
- a first computation sub-module configured to compute, for each of a plurality of different distances with respect to the threshold of the runway along the approach axis of the aircraft, a geographical height on the basis of the position parameters of the aircraft.

14. The device as claimed in claim 11, wherein the first computation module also comprises:
- a second computation sub-module configured to compute, on the basis of the geographical height, a reference terrain profile along an approach axis of an aircraft, the terrain profile representing an evolution of a height of the terrain before the threshold of the runway as a function of the distance with respect to the threshold of the runway,
- a third computation sub-module configured to compute an offset between the reference terrain profile and a terrain profile determined on the basis of heights measured by the radio altimeter,
- a fourth computation sub-module configured to set the reference terrain profile on the determined terrain profile on the basis of heights measured by the radio altimeter by subtracting the computed offset from each distance with respect to the threshold of the runway.

15. The device as claimed in claim 11, further comprising:
- a second measurement module configured to, in an automatic and repetitive manner, during an approach to the runway, measure at least one geographical position of the aircraft, termed the measured geographical position,
- a fourth computation module, configured to compute a lateral deviation, termed the evaluated lateral deviation, between the measured geographical position and a projected position corresponding to the projection of the measured geographical position onto the reference approach trajectory,
- a fifth computation module, comprising computing a lateral error on the basis of a comparison between the evaluated lateral deviation and the reference lateral deviation determined as a function of the parameter corresponding to the signal of the lateral guidance.

* * * * *